(12) United States Patent
Xiao et al.

(10) Patent No.: US 10,686,328 B2
(45) Date of Patent: Jun. 16, 2020

(54) CHARGING DEVICE AND HANDHELD GAME MACHINE

(71) Applicant: Futurepath Technology (Shenzhen) Co., Ltd., Shenzhen (CN)

(72) Inventors: Jun Xiao, Shenzhen (CN); Xiaobo Wang, Shenzhen (CN); Haizhen Li, Shenzhen (CN); Jianming Lu, Shenzhen (CN); Mingshui Ruan, Shenzhen (CN)

(73) Assignee: FUTUREPATH TECHNOLOGY (SHENZHEN) CO., LTD., Shenzhen (CN)

(*) Notice: Subject to any disclaimer, the term of this patent is extended or adjusted under 35 U.S.C. 154(b) by 94 days.

(21) Appl. No.: 15/990,695

(22) Filed: May 28, 2018

(65) Prior Publication Data
US 2019/0296571 A1    Sep. 26, 2019

(30) Foreign Application Priority Data
Mar. 26, 2018 (CN) ........................ 2018 1 0254233

(51) Int. Cl.
*H01M 10/46* (2006.01)
*H02J 7/34* (2006.01)
*A63F 13/98* (2014.01)
*H02J 7/00* (2006.01)

(52) U.S. Cl.
CPC .............. *H02J 7/342* (2020.01); *A63F 13/98* (2014.09); *H02J 7/0042* (2013.01)

(58) Field of Classification Search
CPC ................................ H02J 7/355; H02J 7/0042
USPC .......... 320/107, 114, 115; D13/103, 107, 108
See application file for complete search history.

(56) References Cited

U.S. PATENT DOCUMENTS

| | | | |
|---|---|---|---|
| 2,991,376 A * | 7/1961 | Sherwood | H02J 7/0042 307/156 |
| 9,895,606 B1 * | 2/2018 | Kamata | A63F 13/428 |
| 2006/0006839 A1 * | 1/2006 | Smith | H01M 2/1022 320/114 |
| 2015/0207351 A1 * | 7/2015 | Hamburgen | H02J 7/0044 320/114 |

* cited by examiner

*Primary Examiner* — Edward Tso
(74) *Attorney, Agent, or Firm* — Cheng-Ju Chiang

(57) ABSTRACT

A charging device for a mobile terminal includes a mobile power supply for charging the mobile terminal and two handles respectively located at two sides of the mobile power supply. The mobile power supply is provided with a retaining member for being detachably connected with the mobile terminal. In use, users can use the handles to operate the mobile terminal, thereby avoiding discomfort of the wrists of the users caused by using the mobile terminal for a long time. The mobile power supply is capable of charging a battery within the mobile terminal to extend life of the battery.

14 Claims, 5 Drawing Sheets

CHARGING DEVICE AND HANDHELD GAME MACHINE

CROSS REFERENCE TO RELATED APPLICATIONS

This non-provisional patent application claims priority under 35 U.S.C. § 119(a) Chinese Patent Application No. 201810254233.2, filed on Mar. 26, 2018. The application is incorporated herein by reference.

TECHNICAL FIELD

The present invention relates to the field of electronic components, and in particular to a charging device for mobile terminals.

BACKGROUND

As mobile terminals such as handheld gaming consoles, mobile phones, tablet, point of sale (POS) devices become lighter and thinner, the capacity of the batteries thereof is usually small. For example, the battery capacity of Switch handheld gaming consoles is only 4360 mAh, which can not meet the requirement of battery life. Besides, the Switch handheld gaming consoles has no handles which results in discomfort of the wrist after using movably the handheld gaming consoles for a long time.

SUMMARY

Thus, there is a desire for an improved charging device for mobile terminals so as to solve the problems in the prior art that the battery capacity of the Switch handheld gaming device is too low to satisfy the requirement of battery life. There is another desire to overcome the problem that the Switch combinations has no handle which results in discomfort of the wrist after using movably for a long time.

The objective of the present embodiment is achieved by the following technical solutions:

The present embodiment provides a charging device for a mobile terminal comprising a mobile power supply for charging the mobile terminal and two handles respectively located at two sides of the mobile power supply, the mobile power supply is provided with a retaining member for detachably retaining the mobile terminal to the charging device.

Preferably, the retaining member comprises a suctorial member or a holding component located on a side of the mobile power supply.

Preferably, the two handles are respectively and detachably mounted to opposite sides of the mobile power supply.

Preferably, one of the handle and the mobile power supply is provided with a slide rail, and the other of the handle and the mobile power supply is provided with a groove, the slide rail being slidable along the groove.

Preferably, a pair of positioning slots are respectively formed at opposite sides of the slide rail, a pair of positioning protrusions are respectively formed at opposite sides of the groove, the positioning protrusions being engaged in the corresponding positioning slots.

Preferably, the handle is connected to the mobile power supply by a magnetic member.

Preferably, the magnetic member comprises a first magnetic adsorbing body located on the slide rail and a second magnetic adsorbing body located on the groove.

Preferably, the first magnetic adsorbing body is located in an end of the slide rail, and the second magnetic adsorbing body is located in an end of the groove.

Preferably, the charging device of claim 8, wherein one of the first magnetic adsorbing body and the second magnetic adsorbing body is made of permanent magnet material and the other of the first magnetic adsorbing body and the second magnetic adsorbing body is made of permanent magnet material or magnetic conductive material.

Preferably, each of the two handles comprises a holding portion, a holding cavity for holding the mobile terminal being formed between the two holding portions and the top side of the mobile power supply.

Preferably, an adjusting member made of silica gel is arranged on the holding portion.

The present invention further relates to a combination comprising a mobile terminal and a charging device for the mobile terminal, wherein the charging device comprises a mobile power supply for charging the mobile terminal, the mobile power supply being provided with a securing member configured for detachably mounting the mobile power supply to the mobile terminal.

Preferably, the two handles are detachably mounted to opposite sides of the mobile power supply.

Preferably, the mobile terminal is a game machine with a screen and the mobile power supply is mounted to a bottom of the screen.

Preferably, the mobile terminal comprises a rechargeable battery and the mobile power supply is configured for charging the rechargeable battery.

Preferably, each of the two handles comprises a holding portion, a holding cavity being formed between the two holding portions and a top side of the mobile power supply, the mobile terminal being received in the holding cavity.

Compared with the prior art, the present invention has the beneficial effects that:

According to the charging device provided by an embodiment of the present invention, the mobile power supply is used to charge a mobile terminal so as to improve the endurance range thereof. The mobile power supply is provided with a retaining member for being detachably secured the mobile terminal and the two handles respectively located at two sides of the mobile power supply. In use, users can use the handles to operate the mobile terminal, thereby avoiding the discomfort of the wrist caused by using movably the mobile terminal for a long time.

REFERENCE NUMERALS OF MAIN COMPONENTS

| | |
|---|---|
| mobile terminal | 10 |
| keyboard | 11 |
| screen | 12 |
| holding cavity | 13 |
| mobile power supply | 20 |
| groove | 21 |
| positioning protrusion | 211 |
| charging interface | 22 |
| mounting recess | 23 |
| handle | 30 |
| slide rail | 31 |
| positioning slot | 311 |
| upper inserting strip | 312 |
| lower inserting strip | 313 |
| holding portion | 32 |
| adjusting member | 33 |
| limiting portion | 34 |
| suctorial member | 40 |
| sucker | 41 |
| magnetic member | 50 |
| first magnetic adsorbing body | 51 |
| second magnetic adsorbing body | 52 |
| data line | 60 |

DETAILED DESCRIPTION

Below, embodiments of the present invention will be described in greater detail with reference to the drawings. It should be noted that the figures are illustrative rather than limiting. The figures are not drawn to scale, do not illustrate every aspect of the described embodiments, and do not limit the scope of the present disclosure.

Figure 1:
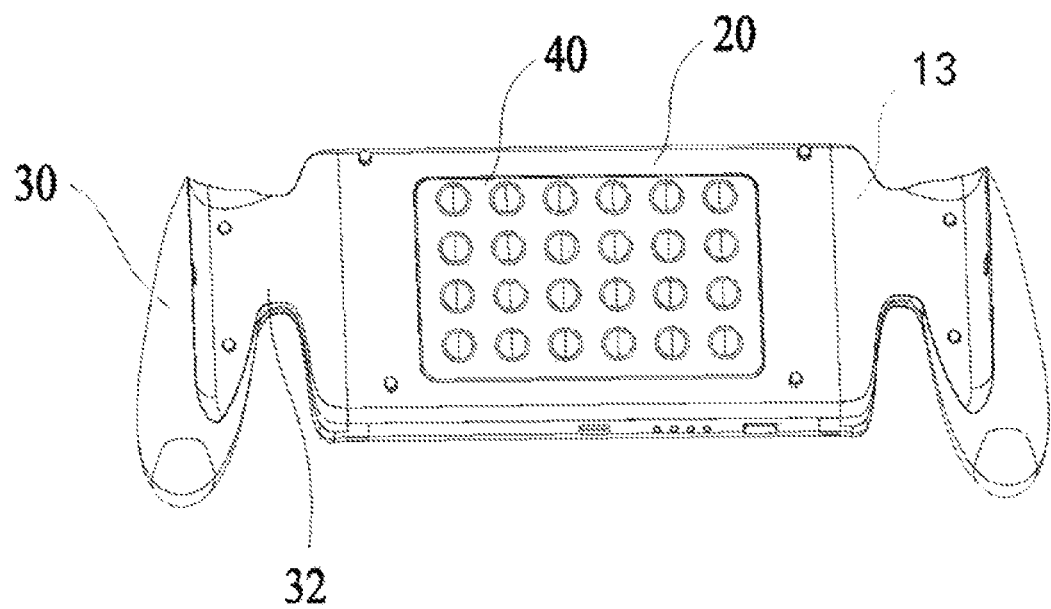
FIG. 1 is a schematic structural view of a charging device for a mobile terminal according to an embodiment of the present disclosure.
Figure 2:
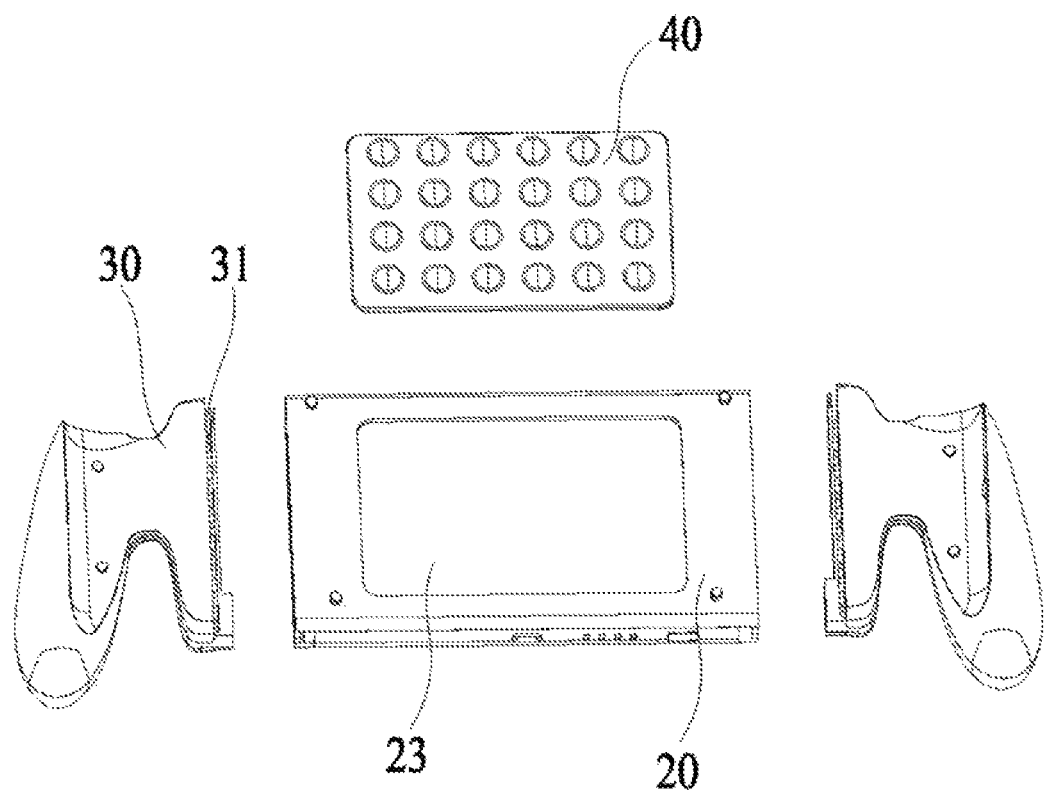
FIG. 2 is an exploded view of the charging device for a mobile terminal of FIG. 1.
Figure 3:
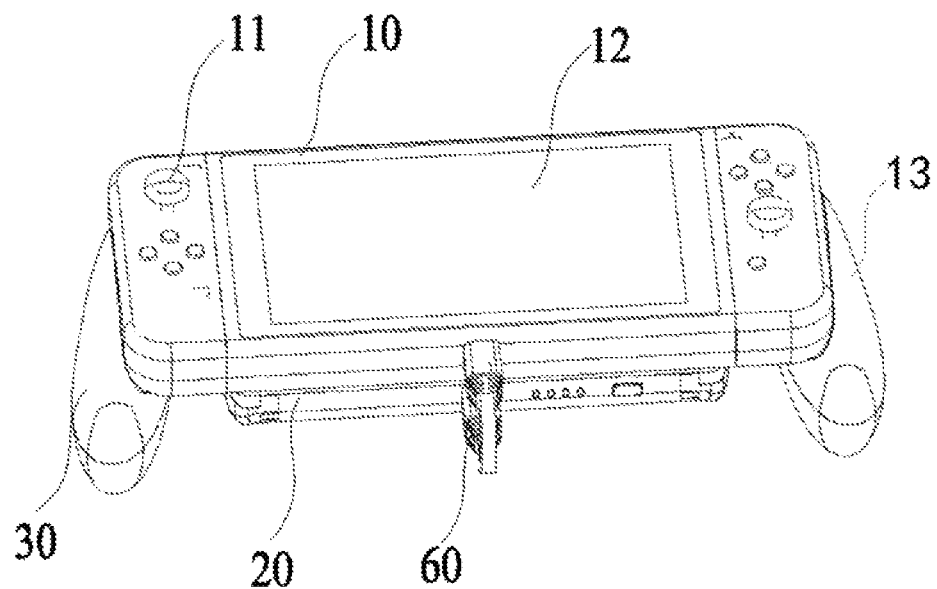
FIG. 3 illustrates a mobile terminal being mounted on the charging device of FIG. 1.
Figure 4:
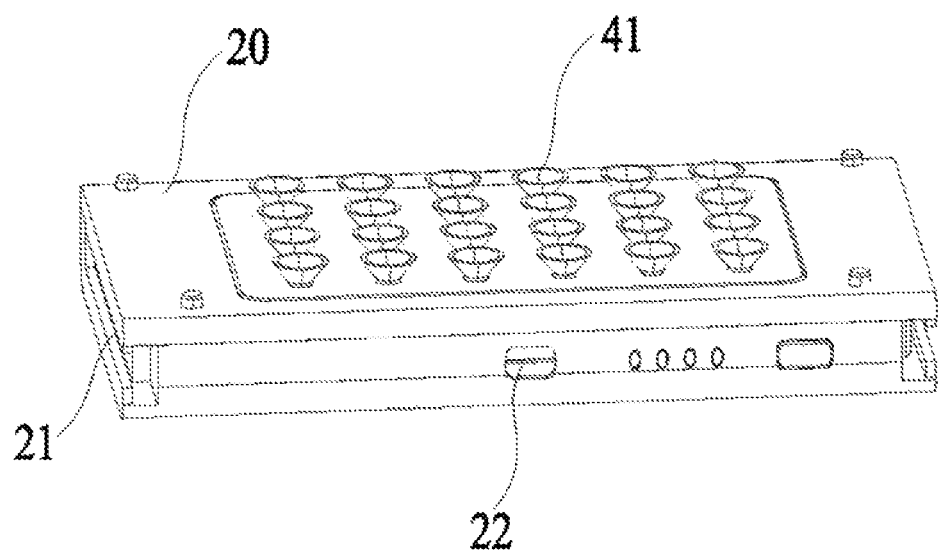
FIG. 4 is a schematic structural view of a suctorial member mounted on the mobile power supply viewed at an angle.
Figure 5:
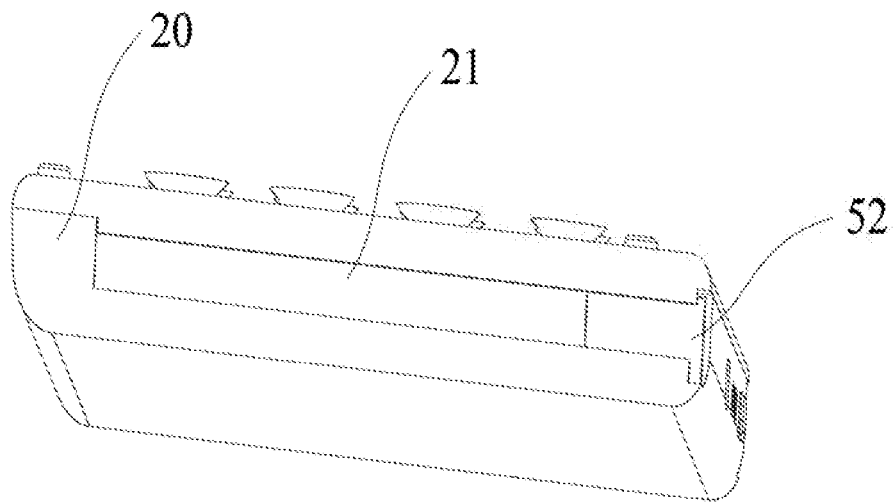
FIG. 5 is a schematic structural view of the suctorial member of FIG. 4 viewed at another angle.
Figure 6:
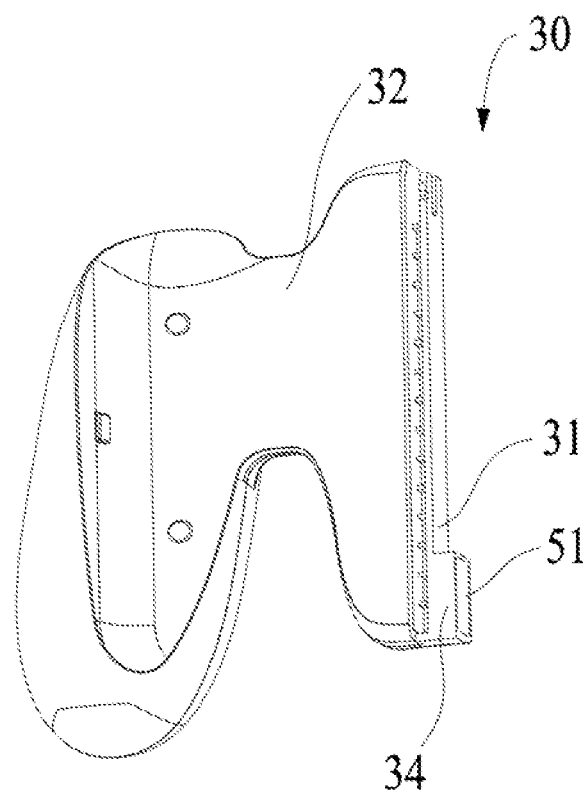
FIG. 6 is a schematic structural view of a handle of the charging device of FIG. 1 viewed at an angle.
Figure 7:
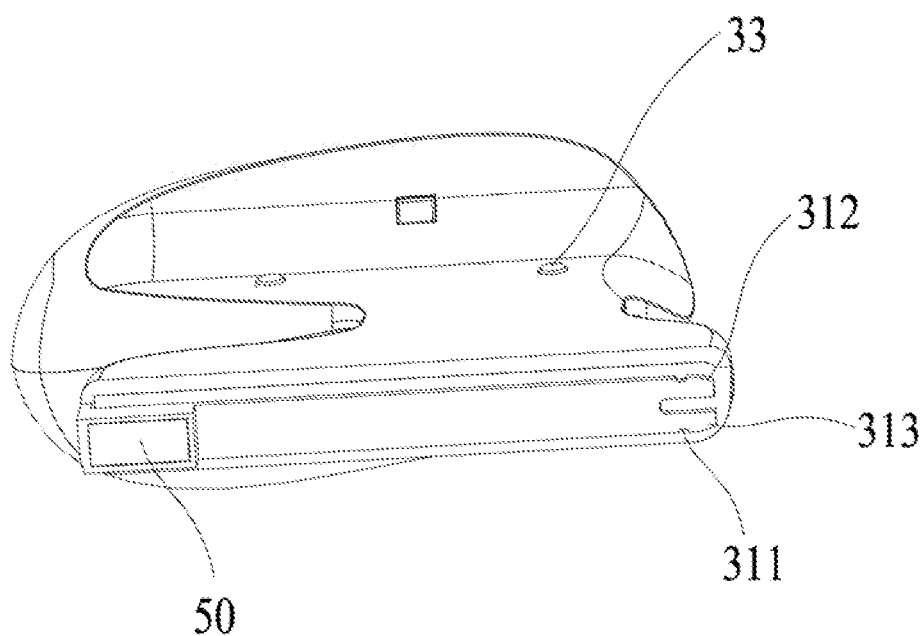
FIG. 7 is a schematic structural view of the handle of FIG. 6 viewed at another angle.
Figure 8:
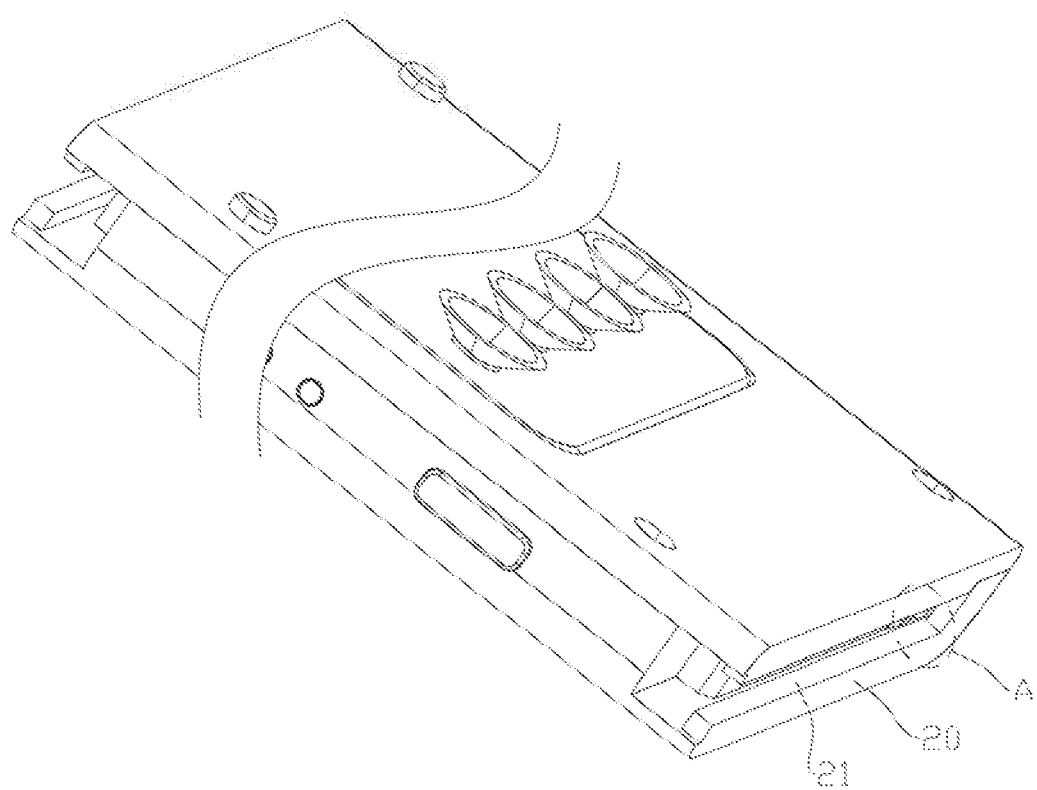
FIG. 8 is another view of FIG. 4.
Figure 9:
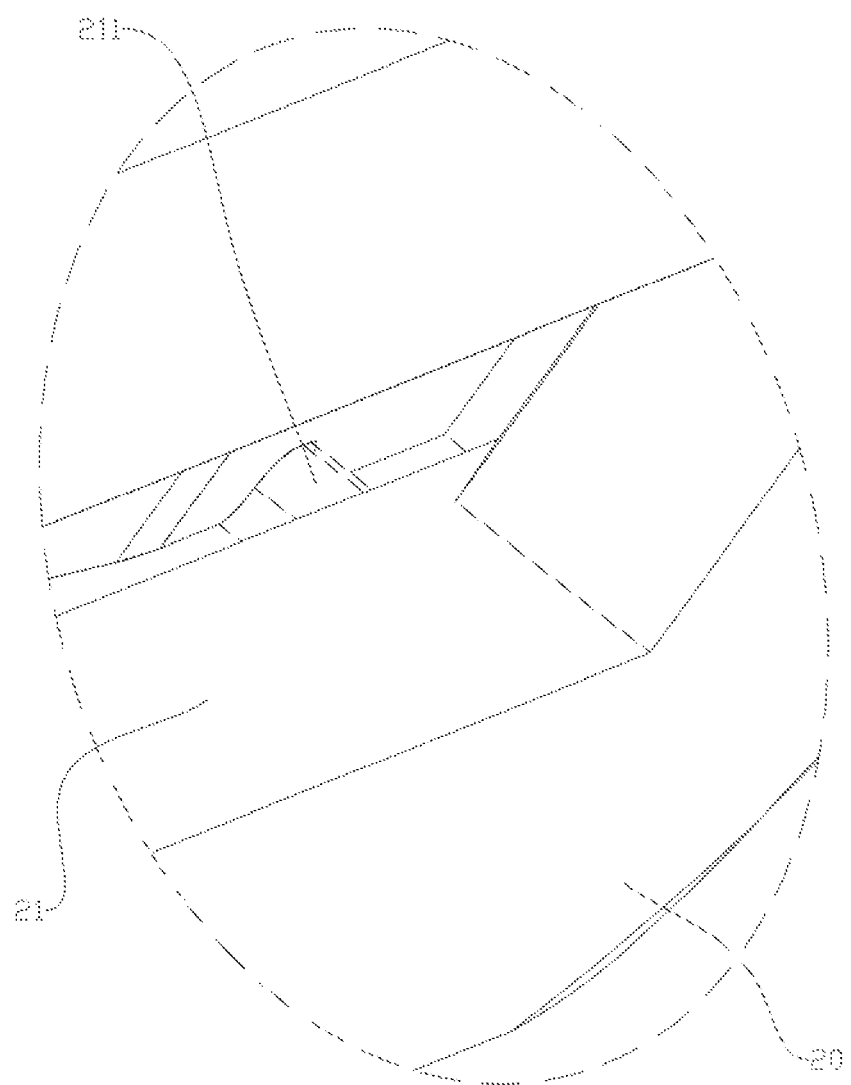
FIG. 9 is an enlarged view of part A in FIG. 8.

As shown in FIG. 1 to FIG. 9, an embodiment of the present invention provides a charging device for a mobile terminal. The charging device comprises a mobile power supply 20 and two handles 30. The mobile power supply 20 comprises charging interfaces 22 respectively located at two sides of the mobile power supply 20. The charging interfaces 22 on the mobile power supply 30 are used to charge a mobile terminal 10 so as to improve the endurance range of the mobile terminal 10. The two handles 30 are respectively located at and connected to two sides of the mobile power supply 20, and the mobile power supply 20 is provided with a retaining member for detachably securing the mobile terminal 10 to the charging device. Preferably, the mobile power supply 20 has a rectangular configuration with a pair of longitudinal sides and a pair of lateral sides. The interfaces 22 are respectively formed at the longitudinal sides and the two handles 30 are respectively connected to the lateral sides. In use, users can use the handle 30 to operate the mobile terminal 10, thereby avoiding the discomfort of the wrists of the users caused by using movably the mobile terminal 10 for a long time.

In one embodiment, the retaining member is a suctorial member 40 or a holding component located on a top side of the mobile power supply 20. Preferably, the retaining member is a suctorial member 40. The upper surface of the mobile power supply 20 is provided with a mounting recess 23, and the suctorial member 40 is located in the mounting recess 23. The charging device is adsorbed to the bottom of the mobile terminal 10 through the suctorial member 40, thereby realizing detachable retaining between the charging device and the mobile terminal 10. In this embodiment, the suctorial member 40 which is adsorbed to the bottom of the mobile terminal 10 includes a plurality of interval suckers 41 arranged in a row and forming a rectangular configuration.

As a preferred embodiment, the two handles 30 are respectively and detachably mounted to opposite sides of the mobile power supply 20, which allows the handles 30 to be replaceable.

The two handles 30 are provided with a slide rail 31 and the mobile power supply 20 is provided with a groove 21; or the mobile power supply 20 is provided with a slide rail 31 and the two handles 30 are provided with a groove 21; the slide rail 31 is slidable in the groove 21. Preferably, in the present embodiment, the two handles 30 are provided with a slide rail 31, the mobile power supply 20 is provided with a groove 21, the slide rail 31 is slidable along the groove 21 so as to facilitate attachment/detachment of the two handles 30 to/from the mobile power supply 20, thereby improving the use range of the charging device. Understandably, the mobile power supply 20 may be individually applied to the mobile terminal 10 without the handles 30 to meet the requirement that users need to extend battery life of the mobile terminal 10 for a short time, the above combination method is also a kind of implementation within the scope of the present invention.

The starting/inserting end of the slide rail 31 is provided with an upper inserting strip 312 and a lower inserting bar 313, the upper inserting strip 312 and the low inserting strip 313 extending along the lengthwise direction of the slide rail 31. There is a gap between the upper inserting strip 312 and the low inserting strip 313 so that the inserting end of the slide rail 31 can be squeezed into the groove 21. In the present embodiment, each of the ends of the upper inserting strip 312 and the lower inserting strip 313 is provided with a chamfer so that the upper inserting strip 312 and the lower inserting strip 313 can be quickly inserted into the groove 21.

As a preferred embodiment, a pair of positioning slots 311 are respectively formed at opposite sides of the slide rail 31, a pair of positioning protrusions 211 are respectively formed at opposite sides of the groove 21, the positioning protrusions 211 being engaged in the corresponding positioning slots 311 so as to prevent the slide rail 31 from leaving the groove 21.

As a preferred embodiment, the trailing end of the slide rail 31 is further provided with a limiting portion 34 which laterally protrudes from the lateral side of the slide rail 31. The groove 21 is provided with a holding slot laterally recessed in the bottom surface of the groove 21, and the limiting portion 34 is inserted into the holding slot when the handle 31 is assembled to the mobile power supply 20.

In the present embodiment, the handle 30 is connected/attached to the mobile power supply 20 by a magnetic member 50, further preventing the slide rail 31 from leaving the groove 21 and providing convenience for the user to implement free combination.

Preferably, the magnetic member comprises a first magnetic adsorbing body 51 located on the slide rail 31 and a second magnetic adsorbing body 52 located on the groove 21. One of the first magnetic adsorbing body 51 and the second magnetic adsorbing body 52 is made of permanent magnet material and the other of the first magnetic adsorbing body 51 and the second magnetic adsorbing body 52 is made of permanent magnet material or magnetic conductive material. When both the absorbing bodies 51, 52 are made of permanent magnet material, the magnetic property of the second magnetic adsorbing body 52 and the first magnetic adsorbing body 51 are opposite so that the two absorbing bodies 51, 52 can be attracted to each other. The first magnetic adsorbing body 51 is located in an end of the slide rail 31. The limiting portion 34 is provided with a first containing slot which is horizontally concaved in the limiting portion 34, and the first magnetic adsorbing body 51 is installed in the first containing slot. The second magnetic adsorbing body 52 is located in an end of the groove 21. The bottom surface of the holding slot is provided with a second containing slot, and the second containing slot is laterally recessed on the bottom surface of the holding slot. The second magnetic adsorbing body 52 is installed in the second containing slot. Thus, the first magnetic adsorbing body 51 and the second magnetic adsorbing body 52 automatically attract each other.

In this embodiment, each of the two handles 30 comprises a holding portion 32, and the two holding portions 32 and the top side of the mobile power supply 20 are connected together to form a holding cavity 13 for holding the mobile terminal therein. The retaining member 40 is capable of preventing the mobile terminal 10 from being sliding away from the holding cavity 13 of the mobile power supply.

An adjusting member 33 made of silicone gel is arranged on the holding portions 32 for supporting the mobile terminal 10 so as to adjust the stability of the mobile terminal 10 when the mobile terminal 10 being mounted to the mobile power supply 20 and prevent the mobile terminal 10 from rotating in the holding cavity 13. Preferably, there are two adjusting members which are respectively disposed on the front and rear sides of the holding portion 32 so as to reduce the friction formed between the mobile terminal 10 and the bottom surface of the holding cavity 13. In the embodiment, the sucker 41 is also made of a silicone gel, and the left and right ends of the mobile terminal 10 placed on the mobile power supply 20 can be kept in the same plane with the two handles 30 because the silicone gel is elastic, thereby the charging device for the mobile terminal is better to accord with the ergonomics requirement.

The present invention provides a charging device for a mobile terminal, the mobile power supply 20 thereof is used to charge a mobile terminal 10 so as to improve the endurance range of the mobile terminal 10. The mobile power supply 20 is provided with a retaining member for detachably securing the mobile terminal 10 to the mobile power supply 20, the two handles 30 respectively located at two sides of the mobile power supply 20. In use, users can use the handle 30 to operate the mobile terminal 10, thereby avoiding the discomfort of the wrist caused by using the mobile terminal 10 for a long time.

The present invention further provides a handheld game machine comprising a charging device as mentioned above. The charging device comprises a mobile power supply 20 for charging the mobile terminal 10 and two handles 30 respectively located at two ends of the mobile power supply 20, the mobile power supply 20 is provided with a securing member configured for detachably mounting the mobile power supply to a bottom of the mobile terminal so that the mobile power supply is electrically connected with the power and can charge the mobile terminal. In an embodiment, the mobile terminal 10 is the handheld game machine. The handheld game machine further comprises a rechargeable battery, two keyboards 11 and a screen 12, the mobile power supply 20 is mounted to the bottom of the screen 12 and is configured for charging the rechargeable battery.

A person skilled in the art may make various other corresponding changes and deformations based on the described technical solutions and concepts. And all such changes and deformations shall also fall within the scope of the present invention.

The invention claimed is:

1. A charging device for a mobile terminal, wherein the charging device comprises:
   a mobile power supply for charging the mobile terminal and two handles respectively located at two sides of the mobile power supply, the mobile power supply is provided with a retaining member for detachably retaining the mobile terminal to the charging device; the two handles are respectively and detachably mounted to opposite sides of the mobile power supply; one of the handles and the mobile power supply is provided with a slide rail, and the other of the handles and the mobile power supply is provided with a groove, the slide rail is configured to slide in the groove.

2. The charging device of claim 1, wherein the retaining member comprises a suctorial member or a holding component located on a side of the mobile power supply.

3. The charging device of claim 1, wherein a pair of positioning slots are respectively formed at opposite sides of the first slide rail, and a pair of positioning protrusions are respectively formed at opposite sides of the groove, the positioning protrusions are engaged with the corresponding positioning slots.

4. The charging device of claim 1, wherein each of the handles is connected to the mobile power supply by a magnetic member.

5. The charging device of claim 4, wherein the magnetic member comprises a first magnetic adsorbing body located on the slide rail and a second magnetic adsorbing body located on the groove.

6. The charging device of claim 5, wherein the first magnetic adsorbing body is located in an end of the slide rail, and the second magnetic adsorbing body is located in an end of the groove.

7. The charging device of claim 6, wherein one of the first magnetic adsorbing body and the second magnetic adsorbing body is made of permanent magnet material and the other of the first magnetic adsorbing body and the second magnetic adsorbing body is made of permanent magnet material or magnetic conductive material.

8. The charging device of claim 1, wherein each of the two handles comprises a holding portion, and a holding cavity for holding the mobile terminal being formed between the two holding portions, and a top side of the mobile power supply.

9. The charging device of claim 8, wherein an adjusting member made of silica gel is arranged on the holding portion.

10. A handheld game machine comprising:
    a charging device of claim 1.

11. The handheld game machine of claim 10, further comprising two handles, wherein the two handles are detachably mounted to opposite sides of the mobile power supply.

12. The handheld game machine of claim 10, further comprising a screen, wherein the mobile power supply is mounted to a bottom of the screen.

13. The handheld game machine of claim 10, further comprising a rechargeable battery, wherein the mobile power supply is configured for charging the rechargeable battery.

14. The handheld game machine of claim 10, further comprising two handles, wherein each of the two handles comprises a holding portion, and a holding cavity being formed between the two holding portions and a top side of the mobile power supply, the mobile terminal is received in the holding cavity.

\* \* \* \* \*